United States Patent
Ashikawa

(10) Patent No.: US 6,954,336 B2
(45) Date of Patent: Oct. 11, 2005

(54) RECORDING TAPE CASSETTE HAVING AN APPROVED REEL LOCK MEMBER

(75) Inventor: Teruo Ashikawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 131 days.

(21) Appl. No.: 10/426,862

(22) Filed: May 1, 2003

(65) Prior Publication Data

US 2003/0206371 A1 Nov. 6, 2003

(30) Foreign Application Priority Data

May 2, 2002 (JP) ..................................... 2002-130671

(51) Int. Cl.[7] ............................................. G11B 23/087
(52) U.S. Cl. ...................................................... 360/132
(58) Field of Search ....................... 360/132; 242/343.2, 242/338.3

(56) References Cited

U.S. PATENT DOCUMENTS

| | | | | |
|---|---|---|---|---|
| 4,214,719 A | * | 7/1980 | Kato | ....................... 242/338.2 |
| 4,225,100 A | * | 9/1980 | Sugawara | ................. 242/338.2 |
| 4,389,690 A | * | 6/1983 | Oishi et al. | .................. 360/132 |
| 4,472,753 A | * | 9/1984 | Wulfing | ....................... 242/343 |
| 4,768,122 A | * | 8/1988 | Kawada | .................... 242/347.1 |
| 5,294,073 A | * | 3/1994 | Oogi | ........................... 242/343 |
| 5,529,256 A | * | 6/1996 | Takahashi et al. | ........ 242/343.2 |

FOREIGN PATENT DOCUMENTS

| | | |
|---|---|---|
| JP | 11-39828 A | 2/1999 |
| JP | 11-176131 A | 7/1999 |

* cited by examiner

*Primary Examiner*—Angel Castro
(74) *Attorney, Agent, or Firm*—Sughrue Mion, PLLC

(57) ABSTRACT

A recording tape cassette which accommodates a reel on which a recording tape is wound. A lock member for locking the reel is rotatably attached at an inner face of a case of the recording tape cassette. The lock member is urged to a reel side thereof, and engages with a gear which is formed at a peripheral edge of a flange of the reel. A guide surface is formed at the lock member such that, at a time when the reel is inserted into the case, the lock member is pushed by the reel and consequently is withdrawn in a direction of releasing locking of the gear. With this structure, an operation of insertion of the reel can be carried out easily, and work efficiency can be improved.

10 Claims, 4 Drawing Sheets

RECORDING TAPE CASSETTE HAVING AN APPROVED REEL LOCK MEMBER

BACKGROUND OF THE INVENTION

1. Field of the Invention

The present invention relates to a recording tape cassette which accommodates, in a case, a reel on which a recording tape, such as a magnetic tape or the like, is wound, and which is equipped with a lock member for preventing slackening of the reel.

2. Description of the Related Art

Commonly, a magnetic tape cassette which is equipped with a magnetic tape to serve as a recording tape has been widely used with recording/replaying devices such as audio equipment, video equipment and the like. For example, a magnetic tape cassette that is utilized for professional use at broadcasting stations and the like rotatably accommodates a pair of reels in a case which has been structured by joining together an upper case and lower case which are made of synthetic resin. Generally, a magnetic tape is wound on one of the reels and a distal end of this magnetic tape is attached to the other of the reels. The magnetic tape is fed out from the one reel to the other reel, and hence recording of information to the magnetic tape and/or playback of information that has been recorded to the magnetic tape is carried out.

At the middle of a front wall of the case, the magnetic tape is exposed so as to be slideable against a recording/replaying head of a recording/replaying device. When the cassette is not in use (when the cassette is not loaded at a recording/replaying device), the front wall of the case is covered by a cover. This cover is structured to be rotatable upward. When the cassette is to be used (i.e., when the cassette has been loaded at a recording/replaying device), the cover is withdrawn to an upper portion of the case, and the magnetic tape is exposed.

Each of the reels on which the magnetic tape is wound is structured by a lower flange, a hub which is integrally fixed to an upper side of the lower flange, and an upper flange which is attached to an upper side of the hub. A distal end of the magnetic tape is attached to the hub, and the magnetic tape is wound round an outer peripheral surface of the hub. Thus, the magnetic tape that has been wound round at the hub is retained by the upper flange and the lower flange. Further, a hole portion is formed in a lower face of an axial core portion of the hub. When the magnetic tape cassette is inserted at the recording/replaying device, a gear provided in the recording/replaying device (hereafter referred to as a driving gear), which is for transmitting rotary driving force, meshes with a gear that is formed at an inner peripheral face of the hole portion. Thus, with this structure, the pair of reels can be rotated.

As shown in FIG. 4, a gear 58A is formed at a peripheral edge of a lower flange 58, and the gear 58A engages with a lock member 60 which is provided in the case. Consequently, slackening of the magnetic tape that is wound on the reel can be prevented. The lock member 60 is provided with a locking plate 66 and an operation lever 64. The locking plate 66 is substantially J-shaped in plan view and is provided extending from an outer peripheral face of a tubular shaft 62. The operation lever 64 is substantially L-shaped in plan view, and is provided extending from the same outer peripheral face at a side thereof which is substantially 180° opposite from the side thereof at which the locking plate 66 is provided. The tubular shaft 62 is fitted over a shaft 70 which is standingly provided at the lower case. Thus, the tubular shaft 62 is supported so as to be freely rotatable in a horizontal direction.

A torsion spring 68 is fitted over an upper portion of the shaft 70 (a portion which is higher than the tubular shaft 62). One end of the torsion spring 68 is engaged at a spring-retaining portion 65, which is formed at an upper portion of the locking plate 66 and is substantially L-shaped in side view. The other end of the torsion spring 68 is engaged at a shaft 72, which is standingly provided at the lower case. The torsion spring 68 urges the locking plate 66 in a direction of engagement with the gear 58A.

For a magnetic tape cassette that is provided with the lock member 60 having the structure described above, the reels are inserted into the case as follows. Specifically, as shown in FIG. 4, the operation lever 64 of the lock member 60 is rotated in a lock release direction (the direction of arrow P) by hand, and the locking plate 66 is separated from the gear 58A. Then the reel is fed in from above. Thus, when the locking plate 66 is rotated in the lock release direction from the gear 58A and withdrawn from an insertion path (access path) of the reel in this manner, an operation of insertion of the reel into the case is carried out smoothly, without any interference at all with the locking plate 66.

Thereafter, the rotation of the operation lever 64 is released. Consequently, the locking plate 66 is rotated in the direction of engagement with the gear 58A by the urging force of the torsion spring 68, and a distal end of the locking plate 66 engages at the gear 58A. As a result, the reel is locked and slackening of the magnetic tape is prevented.

However, with this method of inserting reels, it is necessary to manually rotate the operation levers 64 of the lock members 60 one by one. Therefore, this insertion operation is extremely troublesome and complicated, and work efficiency is not good.

SUMMARY OF THE INVENTION

Accordingly, an object of the present invention is to provide a recording tape cassette for which an operation of insertion of a reel can be carried out with ease, and which can improve work efficiency.

A first aspect of the present invention for achieving the object described above is a recording tape cartridge including: a reel on which a recording tape is wound; a case for rotatably accommodating the reel thereinside; and a lock member, at least a portion of which is movably disposed inside the case and is engaged at the reel by being urged toward the reel for locking rotation of the reel, the lock member including a region which interferes with the reel at a time at which the reel is inserted into the case from a predetermined direction, the region being pushed by movement of the insertion of the reel and the region withdrawing so as to allow the insertion of the reel.

In one embodiment, the reel includes a flange, and the region interferes with the flange. Teeth are formed along a peripheral edge of the flange, and the lock member is urged to engage at any of the teeth for preventing rotation of the reel. When the region is pushed by the movement of the insertion of the reel, the region moves in a direction of releasing locking of the reel. The lock member may include a shaft which is provided protruding at the inside of the case, with the at least a portion of the lock member being provided so as to be rotatable relative to the shaft.

The case includes structure which allows the insertion of the reel from the predetermined direction relative to the case, and the interfering region includes a portion which is diagonal to the direction of insertion, the diagonal portion abutting against the reel at the time of insertion, and the diagonal portion being slidingly moved for withdrawing by the movement of the reel.

Because such a structure is provided, when the reel is inserted into the case after the lock member has been inserted in the case, a guide portion formed at the lock member is pushed by the reel. In consequence, the lock member is withdrawn in a direction of releasing locking with a gear formed at the peripheral edge of the flange of the reel, that is, from an insertion path (an access path) of the reel. Thus, a task such as withdrawing the lock member from the access path of the reel by hand, as in the prior art, is rendered unnecessary, and the operation of inserting the reel into the case can be performed with ease. Consequently, efficiency of the insertion operation can be improved.

DETAILED DESCRIPTION OF THE PREFERRED EMBODIMENTS

Figure 1:
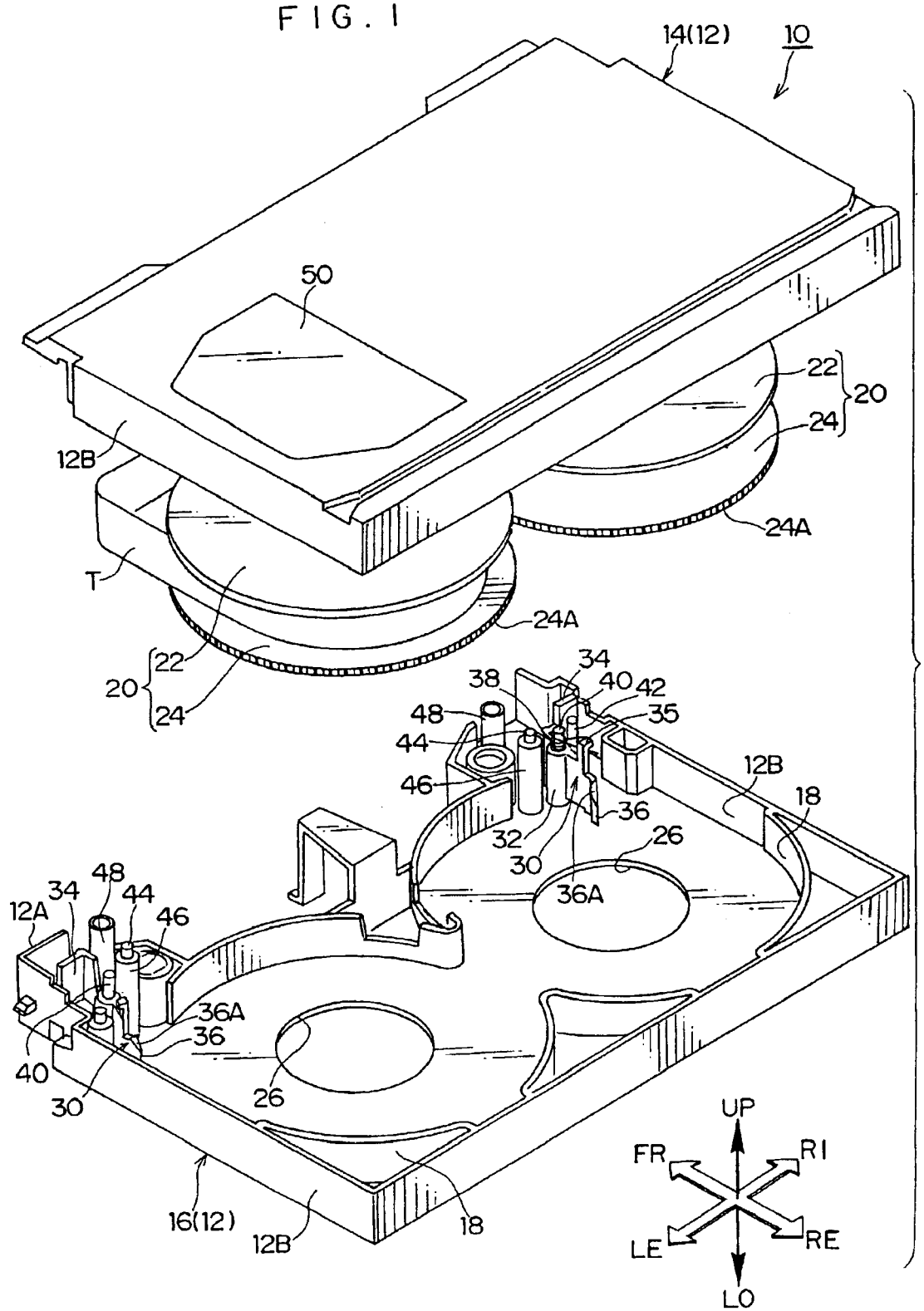
FIG. 1 is a schematic exploded perspective view, viewed diagonally from behind and above, of a magnetic tape cassette relating to the present invention.

Now, an embodiment of the present invention will be described in detail on the basis of an example shown in the drawings. Note that, for ease of explanation, a direction of loading a recording tape cassette into a recording/replaying device (audio equipment, video equipment or the like) is taken to be a forward direction (FR). A rearward direction (RE), an upward direction (UP), a downward direction (LO), a leftward direction (LE) and a rightward direction (RI) are taken by reference to the forward direction. A magnetic tape is employed as the recording tape, and a magnetic tape cassette 10 is described below.

First, the magnetic tape cassette 10 will be described in general. As shown in FIG. 1, the magnetic tape cassette 10 (a BETACAM cassette), which is employed for professional use in broadcasting stations and the like, is provided with a substantially rectangular box-shaped case 12 which is longer in the left-right direction than in the front-rear direction. The case 12 is structured by joining together an upper case 14 and a lower case 16 with a plurality of fixing screws (not shown), which are screwed in from a lower face of the lower case 16.

A magnetic tape T is exposed at the middle of a front wall 12A of the case 12, such that a recording/replaying head (not shown) of the recording/replaying device (not shown) is slideable thereagainst. A cover (not shown), which covers the front wall 12A when the magnetic tape cassette 10 is not in use (when the magnetic tape cassette 10 is not loaded at a recording/replaying device), is provided.

A pair of substantially tubular free play-restricting walls 18 are provided standing from an inner face of the lower case 16, and a pair of reels 20 are rotatably accommodated in each of the free play-restricting walls 18. Each of the reels 20 is structured by a lower flange 24, a hub (not shown) which is integrally fixed at an upper side of the lower flange 24, and an upper flange 22 which is attached at an upper side of the hub. When the magnetic tape cassette 10 is not in use, generally, one end of the magnetic tape T is attached to and wound onto either one of the reels 20, and the other end of the magnetic tape T is attached to the hub of the other of the reels 20. Thus, the magnetic tape T which is wound round at the hub is retained between the upper flange 22 and the lower flange 24.

A circular hole portion (not shown) is recessedly provided in a lower face of an axial core portion of the hub. A reel rotation gear (not shown) is formed at an inner peripheral edge of this hole portion. Correspondingly, a pair of opening holes 26 are cut into the lower case 16 for exposing the reel rotation gears which are provided at the lower face of each reel 20. When the magnetic tape cassette 10 is loaded into the recording/replaying device, a driving gear provided at the recording/replaying device (not shown) advances into the hole portion through the opening hole 26 and meshes with the reel rotation gear. Thus, the pair of reels 20 are structured so as to be rotatable.

A gear 24A, which is formed by substantially crenellated shapes in a radial direction of the lower flange 24, is formed at a peripheral edge of the lower flange 24. A lock member 30 is provided in the case 12. The lock member 30 meshes with the gear 24A and prevents slackening of the magnetic tape T that has been wound on the reel 20.

Figure 2:
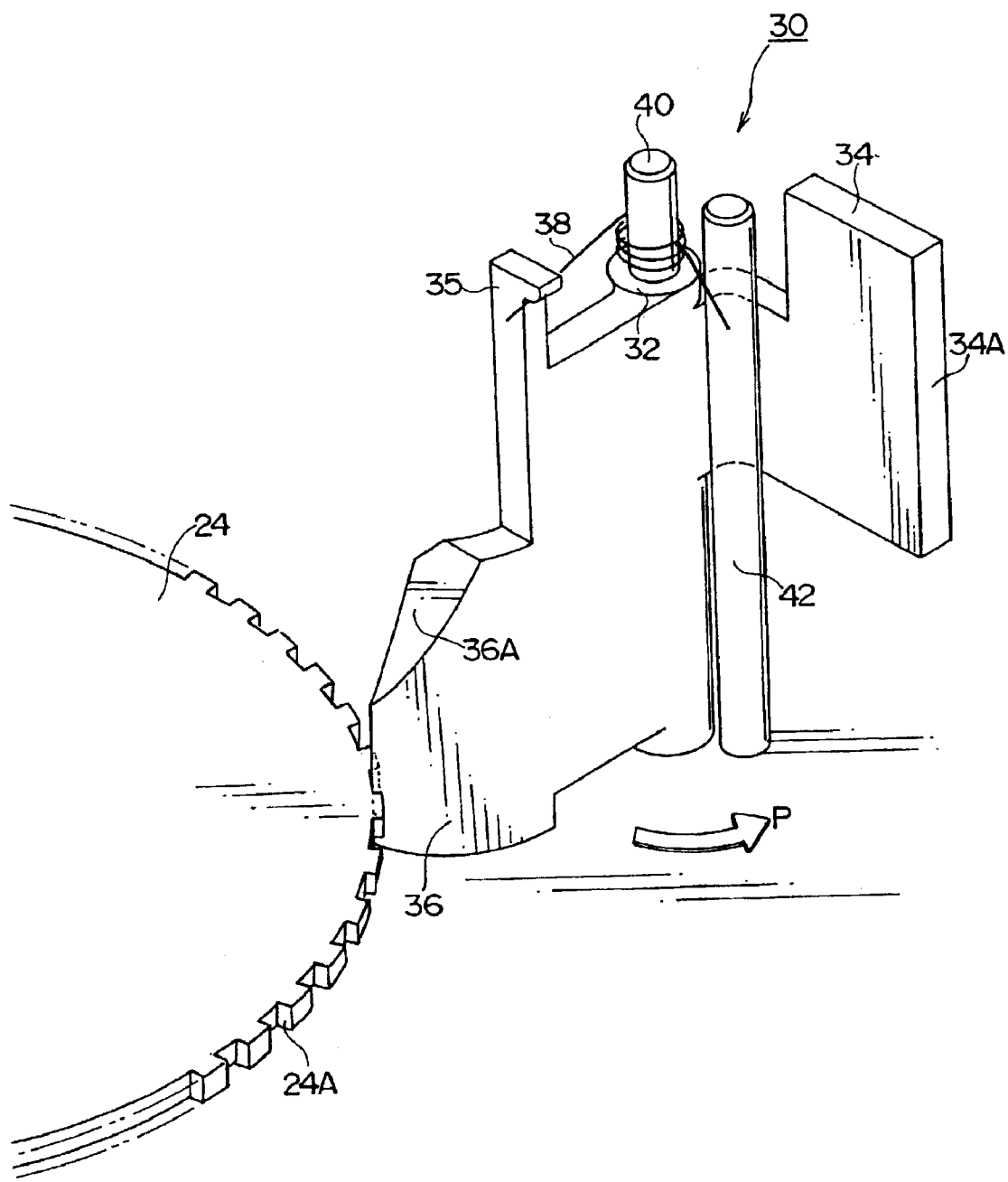
FIG. 2 is a schematic perspective view of a lock member relating to the present invention and a lower flange of a reel.

As shown in FIG. 2, the lock member 30 is provided with a tubular shaft 32, an operation lever 34, and a locking plate 36. The operation lever 34 is substantially L-shaped in plan view and is integrally provided extending from an outer peripheral surface of the tubular shaft 32. The locking plate 36 is substantially J-shaped in plan view and is integrally provided extending from the outer peripheral surface of the tubular shaft 32 at a side thereof which is opposite by substantially 180° from the side thereof at which the operation lever 34 is provided. The tubular shaft 32 is fitted round a shaft 40, which is provided standing from the lower case 16. Thus, the lock member 30 is axially supported to be freely rotatable around the shaft 40 in a horizontal direction, and is structured such that the locking plate 36 can engage with the gear 24A.

A torsion spring 38 is fitted round an upper portion of the shaft 40 which protrudes from an upper portion of the tubular shaft 32 of the lock member 30. One end of the torsion spring 38 is engaged at a spring-retaining portion 35, which is formed at an upper portion of the locking plate 36 and is substantially L-shaped in side view. The other end of the torsion spring 38 is engaged at a shaft 42, which is standingly provided at the lower case 16. The torsion spring 38 urges the locking plate 36 in a direction of engaging with the gear 24A.

Rotation of the locking plate 36 in the direction of engaging with the gear 24A is regulated by a distal end surface 34A of the operation lever 34 abutting against an inner surface of a side wall 12B of the case 12. Thus, in this structure, the locking plate 36 is rotatable from the position at which the distal end surface 34A of the operation lever 34 abuts against the inner surface of the side wall 12B of the case 12 in a direction of releasing locking of the gear 24A (the direction of arrow P in FIG. 2), and when the locking plate 36 engages with the gear 24A, the distal end surface 34A of the operation lever 34 does not abut against the inner surface of the side wall 12B.

As shown in FIGS. 2 and 3, the locking plate 36 of the lock member 30 is diagonally truncated and cut away such that an upper peripheral portion of the locking plate 36, which excludes a distal end lower portion which engages with and locks the gear 24A, forms a diagonal angle in a side view θ of 60° and such that a tapering surface 36A is formed at a predetermined angle facing in the lock release direction (the direction of arrow P). Thus, after the lock member 30 has been inserted at the lower case 16, when the reel 20 is to be inserted from above, the operation of insertion can be performed with ease.

Figure 3A:
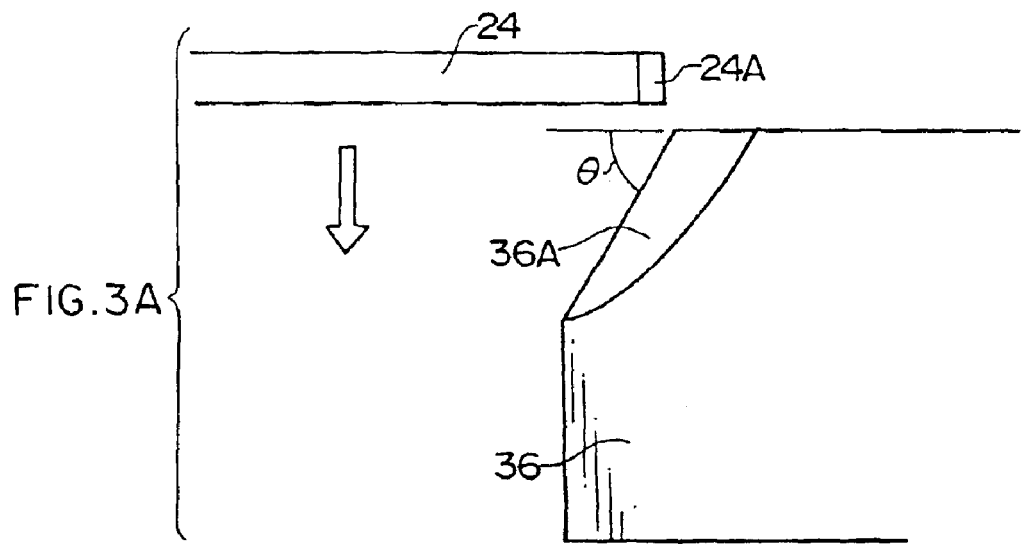
FIGS. 3A to 3C are schematic explanatory diagrams showing a process of inserting a reel in a case at which the lock member is provided.
Figure 3B:
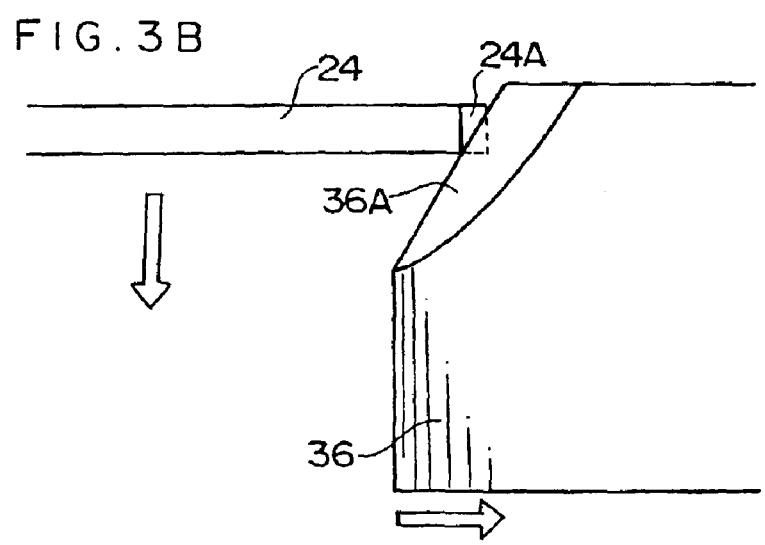
Figure 3C:
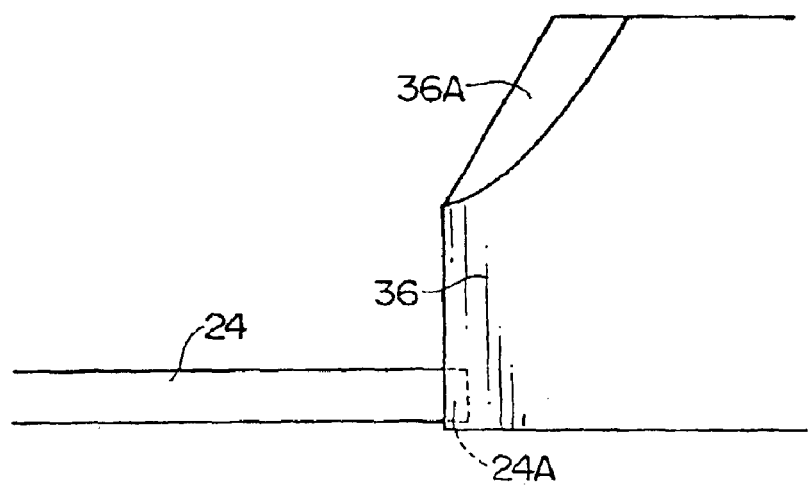
Figure 4:
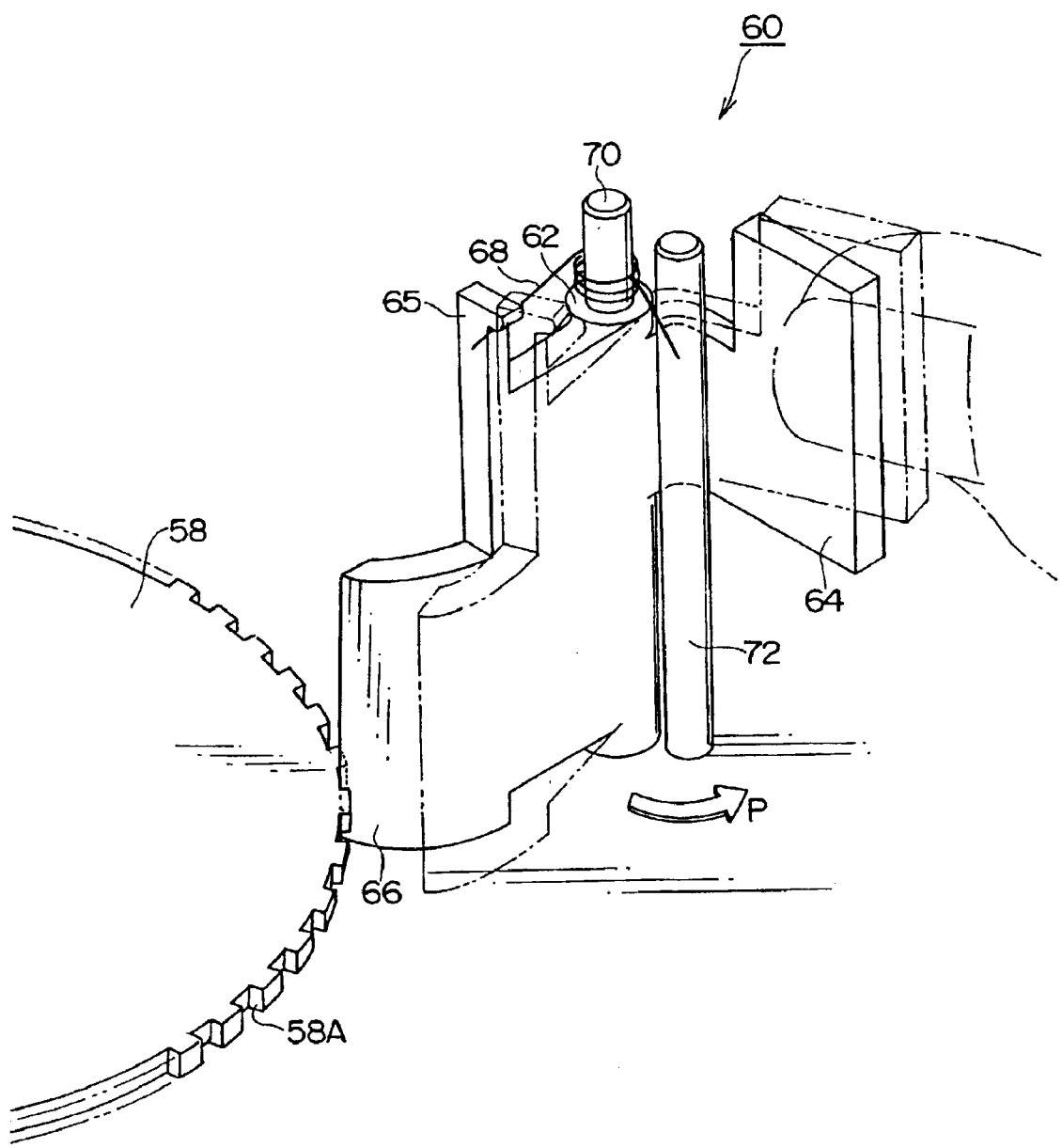
FIG. 4 is a schematic perspective view showing a conventional lock member and a lower flange of a reel.

Specifically, as shown in FIGS. 3A to 3C, when the reel 20 is inserted from above, in accordance with the entry of the reel 20, a recess portion of the gear 24A of the lower flange 24 interferes at the distal end upper peripheral portion of the locking plate 36 that is cut away, and the distal end upper peripheral portion is pressed down. At this time, the downward pressing force is converted into a pressing force in the horizontal direction because of the diagonal angle θ at the distal end upper peripheral portion of the locking plate 36 and the form of the tapering surface 36A.

As a result, the locking plate 36 rotates in the lock release direction against the urging force of the torsion spring 38, and is moved out of an insertion path (access path) of the reel 20. Therefore, the operation of insertion of the reel 20 can be performed easily without manually operating the lock member 30. Although it is optimal if the diagonal angle θ of the distal end upper peripheral portion of the locking plate 36 that has been cut away is 60° (that is, 30° with respect to the reel insertion direction), this angle is not limited to 60° as long as the insertion of the reel 20 can be performed smoothly.

As shown in FIG. 1, a pair of shafts 44, which are fabricated of metal, are provided standing vertically at an inner face of a front portion of the lower case 16. At each shaft 44, a guide roller 46 is loosely fitted. The guide roller 46 is fabricated of synthetic resin, and a through-hole which is circular in plan view is formed along a central axis of the guide roller 46. Hence, the magnetic tape T, while being guided by the guide rollers 46, stably runs (unwinding or rewinding) from one of the reels 20 to the other of the reels 20. Accordingly, it is desirable if the guide roller 46 is formed of a synthetic resin that is smooth and whose mechanical strength is relatively strong, for example, a resin such as POM or the like.

Further, tubular shafts 48, which are fabricated of metal, are provided standing in vicinities of the guide rollers 46 at the inner face of the front portion of the lower case 16. The tubular shafts 48 are provided so as to guide the magnetic tape T, together with the guide rollers 46. Further still, a window portion 50 is provided in the upper case 14. The 50 is for visual observation of the amount of the magnetic tape T that is wound on the reel 20.

Next, a process of inserting the reel 20 at the lower case 16 will be described for the magnetic tape cassette 10 that has the structure described above. The lock member 30 is inserted at the lower case 16 beforehand. Hence, the locking plate 36 is urged in the direction of locking with the gear 24A (a direction opposite to the direction of arrow P) by the torsion spring 38. At this time, the distal end surface 34A of the operation lever 34 abuts against the inner face of the side wall 12B, and further rotation of the lock member 30 is restrained.

In this state, the reel 20 is inserted into the free play-restricting wall 18 of the lower case 16 from above. Consequently, as shown in FIGS. 3A to 3C, the gear 24A of the lower flange 24 interferes with the distal end upper peripheral portion of the locking plate 36 while descending. Because of the diagonal angle θ of the distal end upper peripheral portion and the tapering surface 36A, the locking plate 36 is pushed and rotated (moved) in the direction of releasing locking with the gear 24A (the direction of arrow P), against the urging force of the torsion spring 38.

Thus, the reel 20 is inserted into the case 12 (the free play-restricting wall 18) with ease, without manual operation of the lock member 30. When the distal end lower portion of the locking plate 36 is engaged at the gear 24A by the urging force of the torsion spring 38, the reel 20 is locked, and slackening of the magnetic tape T that is wound on the reel 20 is prevented.

Next, operation of the magnetic tape cassette 10 at which the reel 20 has been inserted as described above will be described. When the magnetic tape cassette 10 is not in use (not loaded at a recording/replaying device), the magnetic tape cassette 10 is stored in a state in which the magnetic tape T is wound on one of the reels 20 and only a distal end of the magnetic tape T is attached at the other of the reels 20, and the front wall 12A of the case 12 is covered by the cover.

At this time, the locking plate 36 of the lock member 30 has been urged by the torsion spring 38 and rotated in the direction of the gear 24A of the lower flange 24. As a result, the distal end lower portion of the locking plate 36 is engaged with the gear 24A of the lower flange 24, each of the reels 20 is locked, and slackening of the magnetic tape T is prevented.

At a time of utilization, the magnetic tape cassette 10 is loaded at a recording/replaying device. At this time, the cover is rotated toward the upper side. A cam (not shown) is provided at a rotation axis (not shown) of the cover. When the cover rotates upward, the cam pushes the operation lever 34 of the lock member 30 frontward, against the urging force of the torsion spring 38. Thus, the operation lever 34 of the lock member 30 is rotated about the tubular shaft 32 (the shaft 40) in a direction of separating the locking plate 36 from the lower flange 24 (the lock release direction of the gear 24A). As a result, locking of the reel 20 is released, and the reel becomes rotatable.

Thereafter, the driving gear meshes with the reel rotation gear, the reels 20 are rotated, and the magnetic tape T is unwound from the one of the reels 20 to the other of the reels 20. Hence, the recording/replaying head of the recording/replaying device slidingly contacts with the magnetic tape T that is drawn out at the side of the front wall 12A of the case 12 and exposed, and recording and/or playback of information is carried out.

When the magnetic tape cassette 10 is to be taken out from the recording/replaying device, the front wall 12A of the case 12 is covered by the cover, and the effect thereof on the operation lever 34 is released. Consequently, the locking plate 36 is engaged with the gear 24A of the lower flange 24 by the urging force of the torsion spring 38, and each of the reels 20 is locked such that the magnetic tape T will not loosen.

As described above, according to the present invention, when a reel is inserted into a case subsequent to insertion of a locking member at the case, the locking member is withdrawn from an entry path of the reel by a guide portion formed at the locking member being pushed by the reel. Thus, the task of inserting the reel into the case can be performed with ease. Consequently, efficiency of the insertion operation can be improved.

What is claimed is:

1. A recording tape cartridge comprising:
  a reel on which a recording tape is wound;
  a case for rotatably accommodating the reel thereinside; and a lock member, at least a portion of which is movably disposed inside the case and is engaged at the reel by being urged toward the reel for locking rotation of the reel, the lock member including a region which interferes with the reel at a time at which the reel is inserted into the case from a predetermined direction, the region being pushed by movement of the insertion of the reel and the region withdrawing so as to allow the insertion of the reel.

2. The recording tape cartridge of claim 1, wherein the reel comprises a flange, along a peripheral edge of which teeth are formed, the lock member being urged to engage at any of the teeth for preventing rotation of the reel.

3. The recording tape cartridge of claim 1, wherein the reel comprises a flange, and the region interferes with the flange.

4. The recording tape cartridge of claim 1, wherein, when the region is pushed by the movement of the insertion of the reel, the region moves in a direction of releasing locking of the reel.

5. The recording tape cartridge of claim 1, wherein the lock member comprises a shaft which is provided protruding at the inside of the case, and the at least a portion of the lock member is provided so as to be rotatable relative to the shaft.

6. The recording tape cartridge of claim 1, wherein the case comprises structure which allows the insertion of the reel from the predetermined direction and the interfering region includes a portion which is diagonal to the direction of insertion, the diagonal portion abutting against the reel at the time of insertion, and the diagonal portion being slidingly moved for withdrawing by the movement of the reel.

7. The recording tape cartridge of claim 6, wherein the diagonal portion comprises an inclination relative to the direction of insertion of substantially 30°.

8. The recording tape cartridge of claim 6, wherein the diagonal portion comprises an inclined surface which includes tapering in the direction of insertion.

9. The recording tape cartridge of claim 1, wherein the lock member comprises a spring member, resilient force of which urges the at least a portion of the lock member toward the reel.

10. The recording tape cartridge of claim 1, wherein the case comprises: a front wall including an opening which exposes a portion of the recording tape for at least one of recording and playback of information on the recording tape; and a cover plate which is movably attached for covering at least the opening, the cover plate including a coupling mechanism which couples the cover plate and the lock member such that, at a time when the cover plate is operated so as not to cover the opening, locking of the reel by the lock member is released and the lock member is withdrawn.

* * * * *